Figure 1:
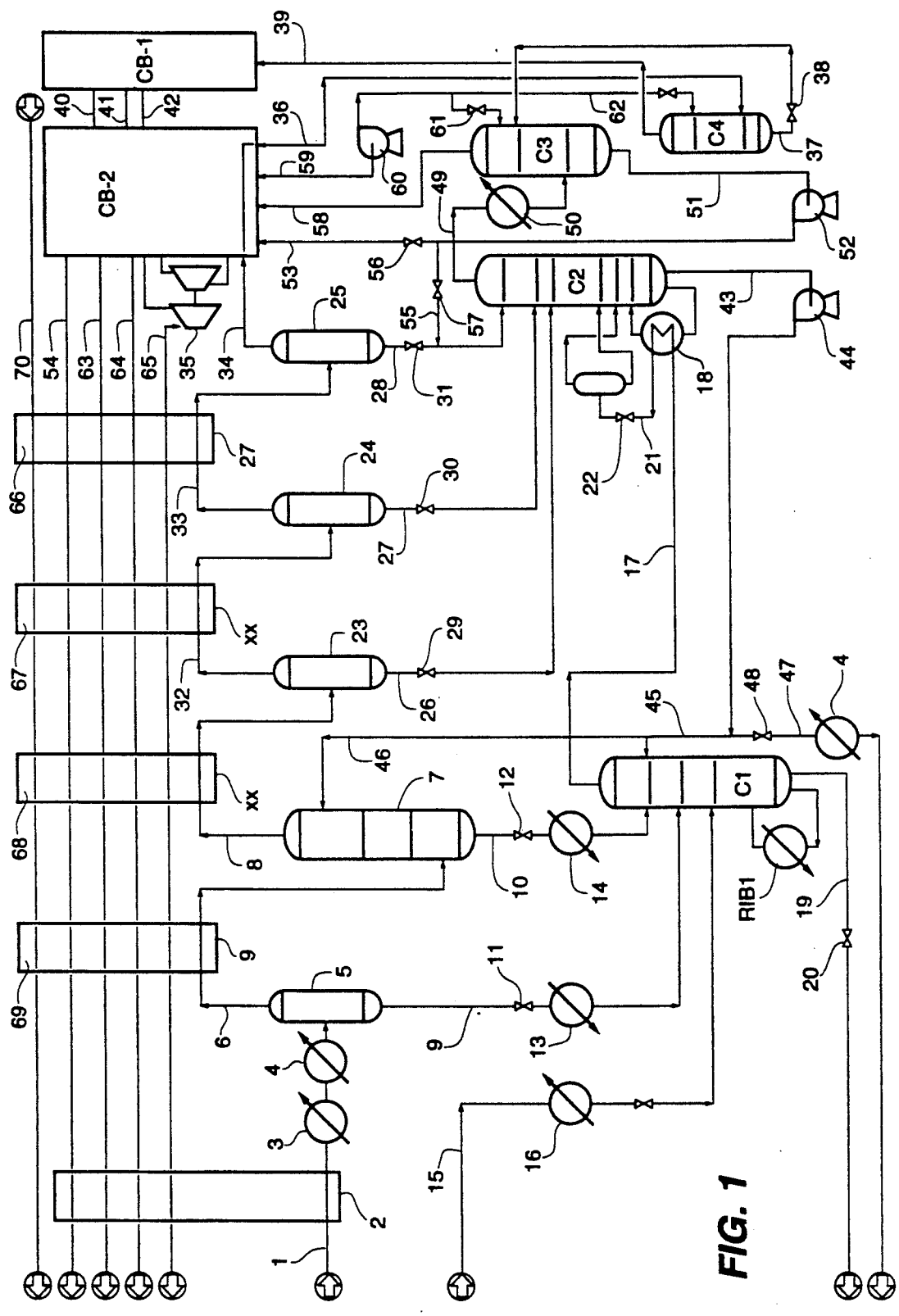

United States Patent

Di Cintio et al.

[11] Patent Number: 5,253,479
[45] Date of Patent: Oct. 19, 1993

[54] METHOD AND APPARATUS FOR RECOVERY OF ETHYLENE AND PROPYLENE FROM GAS PRODUCED BY THE PYROLYSIS OF HYDROCARBONS

[75] Inventors: Roberto Di Cintio; Marcello Picciotti, both of Rome, Italy; Victor Kaiser, Maisons Lahihe, France; Carlo A. Pocini, Rome, Italy

[73] Assignee: TPL S.p.A., Rome, Italy

[21] Appl. No.: 726,341

[22] Filed: Jul. 5, 1991

[30] Foreign Application Priority Data

Jul. 6, 1990 [IT] Italy .................. 48124 A/90

[51] Int. Cl.⁵ .............................................. F25J 3/02
[52] U.S. Cl. ........................................ 62/24; 62/23; 62/28; 62/31
[58] Field of Search ................ 62/23, 24, 28, 31

[56] References Cited

U.S. PATENT DOCUMENTS

| | | | |
|---|---|---|---|
| 2,180,435 | 11/1939 | Schlitt | 62/28 |
| 3,098,107 | 7/1963 | Becker et al. | 62/17 |
| 4,162,273 | 7/1979 | Skraba | 62/28 X |
| 4,163,652 | 8/1979 | Gazzi et al. | 62/28 |
| 4,167,402 | 9/1979 | Davis | 62/28 |
| 4,368,061 | 1/1983 | Mestrallet et al. | 62/24 X |
| 4,370,156 | 1/1983 | Goddin, Jr. et al. | 62/24 X |
| 4,430,102 | 2/1984 | Tedder | 62/24 |
| 4,436,540 | 3/1984 | Dowd et al. | 62/31 X |
| 4,900,347 | 2/1990 | McCue, Jr. et al. | 62/28 X |
| 4,976,849 | 12/1990 | Soldati | 62/23 X |
| 5,114,450 | 5/1992 | Paradowski et al. | 62/23 X |

FOREIGN PATENT DOCUMENTS 0272392 7/1987 European Pat. Off. .
0288912 4/1988 European Pat. Off. .

*Primary Examiner*—Henry A. Bennet
*Assistant Examiner*—Christopher B. Kilner
*Attorney, Agent, or Firm*—James P. Hanrath; Thomas R. Vigil

[57] ABSTRACT

A method and an apparatus for the largest recovery of ethylene and propylene from gas produced by the pyrolysis of hydrocarbons, wherein any liquid current produced by the fractional condensation of the raw gas up to a definite temperature is directly fed to an ethane fractionating column (deethanizer) the bottom product of which is the purified current containing almost all propylene, while any current condensed at lower temperature is fed to a methane separating column (demethanator) provided with a reboiler in which the partial condensation of the overhead vapor of the deethanizer occurs, and the bottom product of the demethanator contains all ethylene.

8 Claims, 2 Drawing Sheets

METHOD AND APPARATUS FOR RECOVERY OF ETHYLENE AND PROPYLENE FROM GAS PRODUCED BY THE PYROLYSIS OF HYDROCARBONS

BACKGROUND OF THE INVENTION

The prevent invention relates to industrial chemistry and more particularly to a method for the largest recovery of ethylene and propylene from gases produced by the pyrolysis of hydrocarbons. This invention relates also to an apparatus for carrying out said method on an industrial scale.

The production of light olefines, such as ethylene and propylene, has considerable economic importance. They are basic chemical products of the polymer industry which are transformed to intermediate products widely used in the consumer goods industry, the motor and mechanical industry, in building, and in domestic articles a.s.o.

The world production of ethylene is around 60 million tons yearly, about 25% of which is produced and used in Europe.

A plant for the production of ethylene needs a considerable investment. In 1990, it was about 1 billion lire per ton per year of ethylene. The energy cost is relatively high, i.e., around 15-20% of the technical production cost.

It is evident that any improvement in the technological design of the plant allowing the investment cost and/or the energy consumption to be reduced has a noticeable industrial interest.

The high operating reliability is, of course, another significant aspect because of the direct influence on the production cost. Both an increase of the operating reliability and a reduction of the maintenance cost, with the consequent reduction of the investment, correspond to the reduction of the number of equipment and, above all, the machinery requested for the production.

The industrial production of the olefines is presently based upon the pyrolysis of hydrocarbons or oil gas at high temperature and in the presence of steam.

A typical volume percentage composition of the dry product gas is the following:

| $H_2$ | $CH_4$ | $C_2-$ | $C_3-$ | $C_{4+}$ | Ethane | Propane | Total |
|---|---|---|---|---|---|---|---|
| 30 | 15 | 30 | 10 | 5 | 8 | 2 | 100 |

The recovery rate and the purity requested for the produced olefines are both very high. The recovery of the ethylene is 99.5% with a purity of 99.95%. The recoverty of propylene is 98% with a purity of 99.5%.

The industrial recovery and the depuration method is based upon the fractional condensation of the pyrolysis gas components and their subsequent condensation by distillation carried out in a sequence of single operations, as shown in the following block diagrams A, B, C:

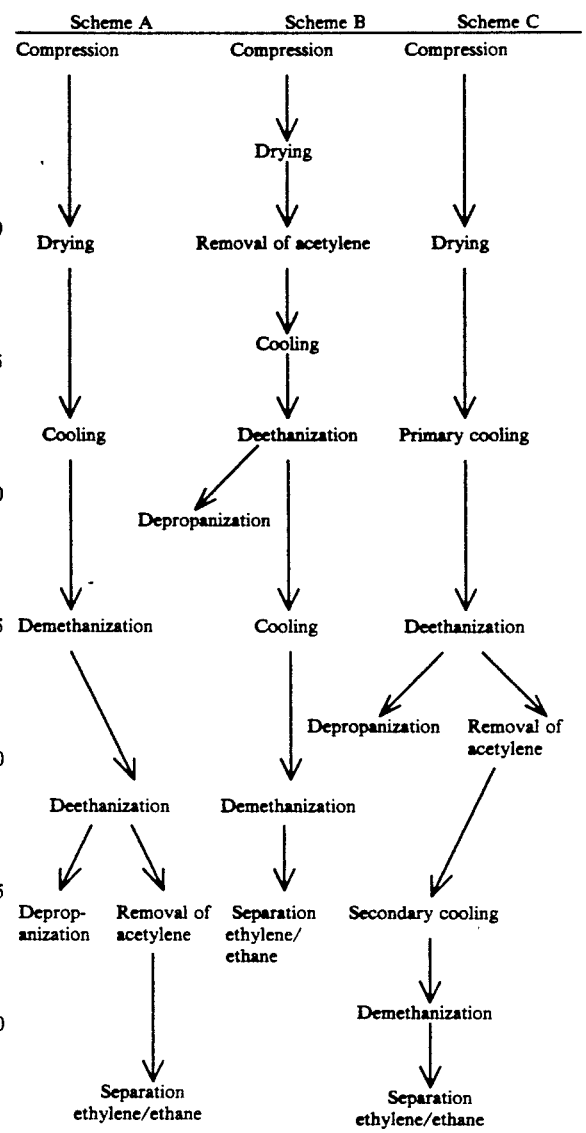

The present state of the industrial practice consists in processing gas in a first section of the system intended for recovering ethylene and components having the highest boiling point which are then separated from hydrogen and methane.

In the next section, the above mentioned mixture is then split into two fractions, one of which contains ethylene, ethane and acetylene, and the other contains propylene and other heavier hydrocarbons.

The first section typically includes two to five distillation columns provided with heat exchangers, vessels and pumps. The second section generally includes one distillation column with the associated equipment. Thus, the whole assembly is a very complex industrial plant.

The present invention relates to the section for the recovery of ethylene and propylene from the raw gas by splitting the mixture containing them in two fractions: the first fraction containing almost all the produced ethylene (with a recovery rate of more than 99.5%); the second fraction containing almost all the propylene (with a recovery rate of more than 99%) and all components having the highest number of carbon atoms (i.e. butadiene, aromatic compounds and gasolines).

This invention seeks to provide a method and an apparatus enabling a considerable improvement of the energy balance and a significant reduction of the number of equipment necessary for the separation as shown in the following diagram D relating to the ethane cracking.

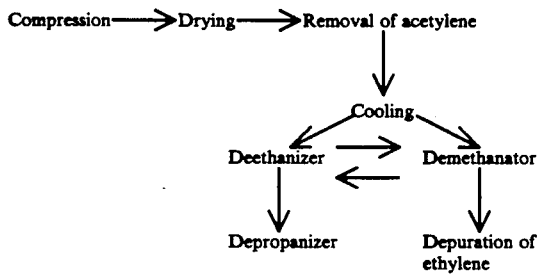

As can be seen from such diagram, the conventional linear open sequence of the single operations is replaced by a triangular or cyclic sequence of single operations at the center of the system.

This invention will now be described with reference to the accompanying drawing showing by way of an illustrative, non-limitative example, a preferred embodiment of the invention.

Figure 2:
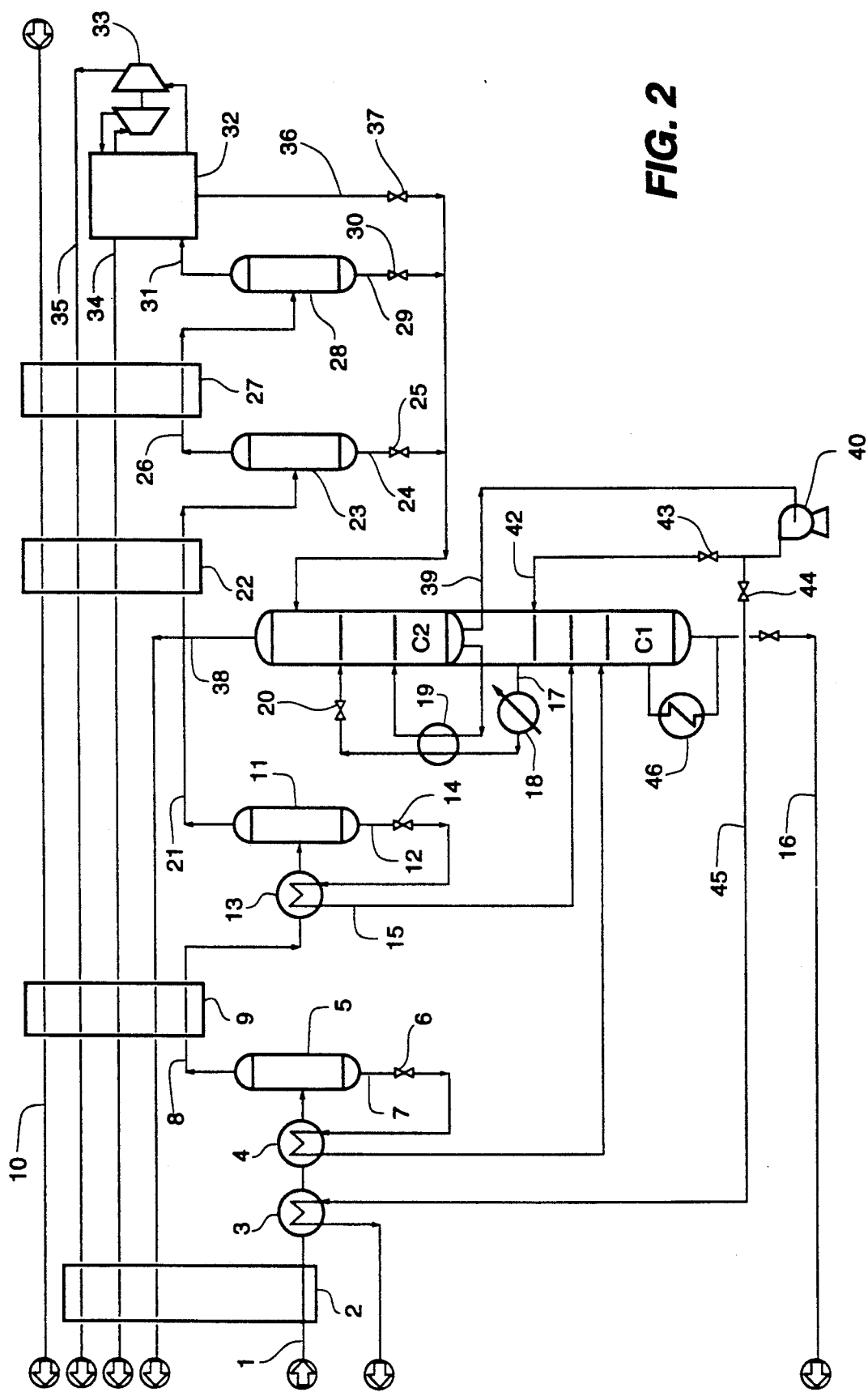

In the drawing:

FIG. 1 shows the block diagram for processing a product gas from the pyrolysis of the hydrocarbons;

FIG. 2 relates to the same processing applied to the particular instance of product gas from the pyrolysis of the ethane.

With reference to FIG. 1, numeral 1 designates the feeding line of the raw pyrolysis gas from a compression system at a pressure selected according to the requested pressure of the produced hydrogen (30–40 bars). Such gas is cooled in a set of heat exchangers 2, 3 and 4. The cold currents of residual gases includes hydrogen and methane, cooling propylene from the cooling cycle, and the liquid 47 separated from the bottom of column $C_2$. For a better evidence, heat exchanger 4 is shown twice in the diagram of FIG. 1, and namely at the input current 1 and at the output current 47.

A fraction of the condensate gas and the resulting liquid are requested in vessel 5 at a temperature between $-30°$ C. and $-40°$ C.

Gas 6 developed from vessel 5 is further cooled in the reverse current flow of the same currents as above and, if necessary, with a cooling agent 70 of the auxiliary looped cooling cycle of the ethylene or the like; the liquid is separated at the bottom of an absorber 7 providing for the preliminary separation of the ethane and lighter components from the propylene and heavier components. Therefore, in case of a gas having a given composition and a predetermined pressure, the temperature of such absorber is a key parameter of the method according to the invention. Such temperature is between $-40°$ C. and $-50°$ C. so as to limit the residual content of propylene in gas 8 flowing out of absorber 7 to a predetermined value generally between 0.5% and 5%.

The washing liquid 46 supplied to absorber 7 is a part of liquid 43 from the bottom of column $C_2$.

Liquids 9 and 10 spit in the vessels 5 and 7, respectively, are expanded in valves 11 and 12, and then are heated in heat exchangers 13 and 14 before being supplied to fractioning column $C_1$, a so-called deethanizer. Tower $C_1$ is additionally supplied in the lower section with liquid 15 from the compression section. This liquid is a similar mixture of hydrocarbons as liquids 9 and 10 but with a heavier molecular weight. Before being supplied to the column, such liquid is subcooled in exchanger 16 with cooling propylene from the cooling cycle of the plant: the feeding of such cooling agent depends in any case on the respective weights of the flowing liquids.

The distillation column $C_1$ is reboiled by reboiler RIBI heated with hot processed water. The operating pressure of column $C_1$ (12 to 20 bars) is selected according to the composition of the gas to be processed; however, it is a little higher than that of the fractionating column $C_2$. In fact, the overhead vapors of column $C_1$ are partially condensed through heat exchanger 18 which is the reboiler of column $C_2$.

The bottom product 19 of column $C_1$ is expanded through valve 20 and supplies the next section of the plant for depurating propylene. Ethylene and ethane are not contained in this product current.

The mixed liquid vapor phase of current 21 at the output of the exchanger/reboiler 18 is expanded in valve 22, and the two resulting liquid flows are fed to column $C_2$ through two separated lines of vapor and liquid, respectively.

Gas 8 from vessel 7 is further cooled in a multi-stage system and then supplied to vessels 23, 24, 25 where the product liquids, i.e. currents 26, 27, 28, respectively, are separated and fed through the respective valves 29, 30, 31 to column $C_2$ at suitable heights according to their composition. The liquid of valve 31 is still fed to the head of column $C_2$.

Gases 32 and 33 from vessels 23 and 24, respectively, are further cooled as already described. Gas 34 at the output of vessel 25 is supplied to the cryogenic system CN-2 (Cold Box-2). The operation of such system does not need any description because it is well known. It essentially consists of a condensation of the residual ethylene in gas 34 at low temperatures between $-120°$ and $-140°$ C. The production of frigories is obtained, for example, by the turboexpander/ compressor 35 supplied with the residual methane gas as described later.

The residual cold gas 36 at the output of CB2 is bed to the ethylene absorber $C_4$ allowing the residual ethylene to be recovered to the largest extent in the bottom liquid 37 thereof. The latter is expanded in valve 38 and supplied to column $C_3$.

Gas 39 including hydrogen, methane and ethylene traces is fed from the head of absorber $C_4$ to system CB1. This system based upon the Joule-Thompson's principle is known to those skilled in the art and is used for splitting hydrogen and methane. The gases at the output of CB1, i.e. pure hydrogen, flow 40, methane at low pressure (methane BP), flow 41, methane at middle pressure (methane MP), and flow 42, are supplied to apparatus CB2 and deliver additional frigories to the latter.

Column $C_2$ so-called "demethanator" is reboiled, as already described, with heat exchanger 18 being heated by the overhead current 17 of the deethanizer. Bottom liquid 43 is sucked by pump 44 and then split into two fractions: fraction 45 (10–30%) of the total amount) is used as reflux of column $C_1$ and as washing liquid for absorber 7; balance fraction 47 is supplied to the section of the plant intended for the final depuration of ethylene, not shown in the figure. This bottom liquid includes methane traces, according to the specific requirement of having pure ethylene, and propylene according to the specific requirement of the recovery thereof. Valve 48 controls flow 47 for the depuration of the produced ethylene.

exceed 50° C. Thus, reboiler is prevented from being dirty due to the polymerization of butadiene.

TABLE I

| $H_2$ | CO | $CH_4$ | $C_2H_2$ | $C_2H_4$ | $C_2H_6$ | $C_3H_4$ | $C_3H_6$ | $C_3H_8$ | $C_4$ | $C_{5+}$ | TOTAL |
|---|---|---|---|---|---|---|---|---|---|---|---|
| 37.78 | 0.08 | 4.32 | 0.41 | 34.69 | 21.17 | 0.01 | 0.50 | 0.08 | 0.64 | 0.3 | 100 |

Overhead vapor 49 from column $C_2$ is partially condensed in exchanger 50 in a reverse current of the cooling ethylene of the secondary cycle and supplied to column $C_3$. Bottom liquid 51 of the latter is sucked by pump 52: a fraction, flow 53, is used for the refrigeration of system CB2 and supplied as recycle flow 54 from the latter to the compression system of the raw gas; the balance, flow 55, is supplied as reflux to the head of column $C_2$. Valves 56 and 57 control such flows.

Product gas 58 of the head of column $C_3$ is cooled in system CB2. Condensed liquid 59 is sucked by pump 60: a fraction, flow 61, is supplied as reflux to column $C_3$; the balance fraction, flow 62, is fed to absorber $C_4$.

Cold gases from system CB2, i.e. recycle flow 54, hydrogen 63, methane BP 64 (low pressure methane), methane MP 65 (middle pressure methane), are brought to room temperature through heat exchangers 66, 67, 68, 69 and 2 in the countercurrent of the raw gas.

FIG. 2 shows the separation of a product gas from the pyrolysis of ethane having the composition (molar-%) set forth in Table I set forth on page 8a. With reference to FIG. 2, numeral 1 indicates the inlet of the raw gas at 15° C. and 36 bars from the compression sections and the caustic cleaning and drying sections upstream of the separation system. Gas 1 is cooled in three subsequent heat exchangers as follows in heat exchanger 2 in the reverse flow of cold gases, hydrogen 34, combustible gas 34 and recycle flow 38; in heat exchanger 3, in the reverse current of liquid 45 from the bottom of column $C_1$; and in heat exchanger 4, in the reverse current of the liquid expanded in valve 6 from separator 5.

The condensed liquid is separated in vessel 5 at a temperature between 30° C. and 40° C. Liquid 7 is expanded as shown in valve 6 and then subjected to a heat exchange with the inlet gas in heat exchanger 4 and fed to column $C_1$ at about $-20°$ C. Gas 8 is cooled in heat exchanger 9 in the reverse flow of cold gases and the cooling ethylene 10 from the looped duty cycle. Outlet gas 8 from heat exchanger 9 is first cooled in heat exchanger 13 and then supplied to vessel 11 at about $-45°$ C. Outlet liquid 12 from vessel 11 is expanded in valve 14 and heated in heat exchanger 13 in the reverse flow of gas 8, as already described. Liquid 15 is fed to the upper section of column $C_1$.

At the bottom of column $C_1$ a liquid 16 is separated which is in practice free from ethylene and includes more than 94% of the propylene contained in the gas, and any other heavier hydrocarbons. Such liquid can be fed to the depuration section of the propylene or vaporized and added to the flow of combustible gas.

In the same way as in the already described general diagram column $C_1$ is reboiled by heat exchanger 46 with a suitable selected fluid such as process water generally at 80° C. The pressure of column $C_1$ is about 30 bars, and the temperature of the bottom does not Gas 17 is separated at the top of the column $C_1$ where there is little propylene and all other ethane components and lighter components. Gas 17 is partially condensed in exchanger 18 and cooled by the refrigerating propylene drawn from the refrigerating cycle, and then it is supplied to exchanger 19, i.e. the reboiler of column $C_2$. The fluid is then expanded in valve 20 and fed to column $C_2$ which operates at a pressure of about 12 bars, said column being placed on column $C_1$ as shown in the Figure.

Gas 21 developed from vessel 11 is cooled in exchanger 22 in the reverse flow of cold gases and ethylene of the refrigerating cycle. Liquid 24 from separator 23 is expanded in valve 25 and fed to column $C_2$. Gas 26 is further cooled in exchanger 27, the construction of which is similar to exchanger 22. Liquid 29 separated in vessel 28 is expanded in valve 30 and fed to the head of column $C_2$ along with the already mentioned liquid 24.

Gas 31 separated from the condensate in separator 28 is fed to a cryogenic system 32 which allows the residual 3-5% of ethylene still contained in gas 31 to be recovered. The frigories needed in such system 32 are produced by the expansion turbine 33 expanding the hydrogen-methane mixture resulting from the separation of ethylene.

The coupling of systems 32 and 33 is well known and will not be described in greater detail. Cold gases, hydrogen at high pressure 34, and combustible gas 35 are progressively brought to room temperature in exchangers 27, 22, 9 and 2, as already described, thus recovering the frigories provided therein.

Liquid 36 separated in system 32 is expanded through valve 37 and supplied together with other flows 24 and 29 to the top of column $C_2$. Head gas 38 of such column is recycled through exchangers 9 and 2 to the compression system of the raw gas to recover ethylene contained therein.

Liquid 39, essentially free from methane, is separated at the bottom of column $C_2$. Such liquid 39 is supplied through pump 40 to the not shown downstream section for separating and depurating ethylene. Fraction 42 acting as reflux of column $C_1$ is separated from liquid 39. Flow 42 does not exceed 15% of liquid flow 39 and in some cases can be reduced to zero if the requested recovery of propylene is relatively low, i.e. about 70–80%. Valves 43 and 44 allow the respective flow rates to be controlled. Flow 45 represents the recovery of ethylene and ethane hydrocarbons and is heated as already described in exchanger 3 before being supplied to the ethylene depuration section.

In the present method and apparatus, the efficiency is improved by 30-40% since the power rate of the refrigerating compressors is about 120 kWh for 1000 kg of produced ethylene compared with the power rate of 160-200 kWh typically requested by the conventional systems.

The present invention has been illustrated and described according to a preferred embodiment, but it should be understood that changes and modifications can be made by one skilled in the art without parting from the scope of the present invention.

We claim:

1. A method for recovery of ethylene and propylene from a raw gas produced by a pyrolysis or hydrocarbons and for splitting said gas into first and second depurated current flows, the first containing almost all ethylene and the second containing almost all propylene, comprising the steps of:
   providing a fractional condensation of the raw gas from compression, caustic washing, and drying sections in a separation system with progressive plural cooling stages;
   feeding a first condensate liquid of the first cooling stage and any mixture of liquid hydrocarbons from the compression section at a predetermined temperature to a deethanizer column to obtain as a bottom produce a depurated current containing almost all propylene;
   feeding a second condensate liquid of the following cooling stages at lower temperatures to a demethanator column to obtain as a bottom produce a depurated current containing almost all the ethylene;
   feeding a deethanizer overhead vapor stream to a heat exchanger employed as a demethanator reboiler, wherein said deethanizer overhead vapor stream is partially condensed;
   supplying said partially condensed overhead vapour from the deethanizer to the demethanator.

2. The method of claim 1 wherein the temperature is reached and controlled by a separator/absorber in the first cooling stage.

3. The method of claim 1 wherein the temperature is reached and controlled by a pre-cooling pressurized feed gas.

4. The method of claim 11 wherein the temperature is reached and controlled by recycling to the separator/absorber of the first cooling stage, a portion of the bottom product of the demethanator containing almost all ethylene.

5. The method of claim 1 wherein the bottom product of said demethanator containing almost all ethylene is also partially used as reflux to the deethanizer.

6. The method of claim 1 wherein the overhead vapour of the demethanator is depurated in a cryogenic apparatus so as to recover the ethylene from the residual gases.

7. The method of claim 1 wherein the raw gas is a pyrolysis gas from ethane or ethane/propane, and the overhead vapour of the demethanator is recycled to a gas compressor without cryogenic treatment.

8. The method of claim 1 wherein the column of the demethanator is placed on the column of the deethanizer, a condenser of which is partially formed by the reboiler of the demethanator.

* * * * *